United States Patent [19]

Barton et al.

[11] Patent Number: 4,940,767

[45] Date of Patent: Jul. 10, 1990

[54] SILYLENE- AND DISILYLENEACETYLENE POLYMERS FROM TRICHLOROETHYLENE

[75] Inventors: Thomas J. Barton; Sina Ijadi-Maghsoodi, both of Ames, Iowa

[73] Assignee: Iowa State University Research Foundation, Inc., Ames, Iowa

[21] Appl. No.: 226,444

[22] Filed: Aug. 1, 1988

[51] Int. Cl.$^5$ .............................................. C08G 77/60
[52] U.S. Cl. ........................................ 528/35; 528/10; 528/32
[58] Field of Search ............................. 528/10, 32, 35

[56] References Cited

U.S. PATENT DOCUMENTS

| | | | |
|---|---|---|---|
| 3,660,449 | 5/1972 | Schaschel | 260/448.2 N |
| 3,699,140 | 10/1972 | Chandra et al. | 260/448.2 N |
| 3,700,714 | 10/1972 | Hamilton et al. | 260/448.2 B |
| 3,714,118 | 1/1973 | Chandra et al. | 260/46.5 UA |
| 3,758,541 | 9/1973 | Chandra et al. | 260/448.2 Q |
| 4,260,780 | 4/1981 | West | 556/430 |
| 4,276,424 | 6/1981 | Peterson, Jr. et al. | 556/430 |
| 4,339,562 | 7/1982 | Guselnikov et al. | 528/14 |
| 4,618,666 | 10/1986 | Porte | 528/33 |
| 4,800,221 | 1/1989 | Marko | 528/10 |

FOREIGN PATENT DOCUMENTS 914935 1/1963 United Kingdom .

*Primary Examiner*—Melvyn I. Marquis
*Attorney, Agent, or Firm*—Zarley, McKee, Thomte, Voorhees & Sease

[57] ABSTRACT

Organosilane polymers having recurring silyleneacetylene and/or disilyleneacetylene units are prepared in a one-pot synthesis from trichloroethylene. Depending on the organic substituents (R and R'), these polymers have useful film-forming properties, and are converted to the ceramic, silicon carbide upon heating in very uniform high yields. They can also be pulled into fibers.

10 Claims, No Drawings

SILYLENE- AND DISILYLENEACETYLENE POLYMERS FROM TRICHLOROETHYLENE

GRANT REFERENCE

This invention was made with Government support under Contract No. W-7405-ENG-82 awarded by the Department of Energy. The Government has certain rights in the invention.

BACKGROUND OF THE INVENTION

The present invention relates to organosilicon polymers having recurring silyleneacetylene units. In particular, the invention relates to reaction products of trichloroethylene and n-butyllithium followed by quenching with certain dichlorosilanes to provide useful polymers that have good film-forming properties, one of which has a pendant aryl group that can be pulled into fibers, all of which are thermally converted into silicon carbide with a high ceramic yield, and many of which offer attractive candidates for electrical conduction and non-linear optical properties.

Moreover, it is unique to the present invention that the polymers are prepared in high yield, in a single pot economical reaction, which uses convenient and ordinary temperature and pressure limits and ranges.

Accordingly, it is the primary objective of the present invention to prepare a series of silylene- and disilyleneacetylene polymers that can be cast into films, that if they have a pendant aryl moiety fibers can be pulled from the polymer, that are polymers that can be thermally converted in high ceramic yield into silicon carbide, and which provide polymers which are attractive candidates for electrical conduction and nonlinear optical properties.

The method and means of accomplishing this primary objective, as well as others, will become apparent from the detailed description of the invention which follows hereinafter.

SUMMARY OF THE INVENTION

This invention relates to silylene- and disilyleneacetylene polymers. The polymers are prepared by reacting trichloroethylene with n-butyllithium, followed by quenching with $RR'SiCl_2$ to produce silyleneacetylene polymers or followed by quenching with $ClR_2SiSiR_2Cl$ to form disilyleneacetylene polymers.

DETAILED DESCRIPTION OF THE INVENTION

This invention involves preparation of two different, but distinctly related, organosilicon polymers. The first has a recurring silyleneacetylene unit, and the second has a recurring disilyleneacetylene unit.

The first group of polymers have a recurring silyleneacetylene unit of the formula:

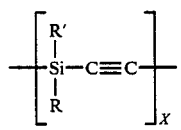

wherein R and R' represent an organic moiety and "X" is an integer of from 20 to 500. This is hereinafter referred to, from time to time, as a "Type A" polymer.

The second group of polymers that are prepared in accordance with this invention have a recurring disilyleneacetylene unit of the following formula:

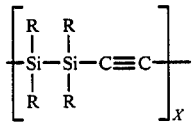

wherein "X" is an integer of from 20 to 500 and R is an organic moiety. These are for brevity referred to from time to time hereinafter as "Type B" polymers.

Whether a Type A silylene- polymer is formed, or a Type B disilylene- polymer is formed depends upon the quenching reaction and whether or not it uses for the quench $RR'SiCl_2$ (Type A polymers) or $ClR_2SiSiR_2Cl$ (Type B polymers).

In the general formulas given for the recurring monomer units of both Type A and Type B as hereinbefore described, R can be any organic moiety, but is preferably selected from the group consisting of hydrogen, $C_1$ to $C_{20}$ alkyl, $C_6$ to $C_{20}$ aryl, and $C_7$ to $C_{20}$ alkylaryl. Preferably, R is selected from the group consisting of hydrogen and $C_1$ to $C_5$. Most preferably R is either hydrogen or methyl. Hydrogen and methyl are most preferred because these will provide the highest yield of silicon carbide upon heating.

The polymers of this invention, whether Type A polymers or Type B polymers, generally have a molecular weight within the range of about 2,000 to about 120,000. The average molecular weight on a weight average basis is generally around 20,000. The number of recurring units in the polymer will vary from as little as 20 up to 500, but preferably will have an average chain length within the range of from about 200 to about 300 recurring units. Further the details of the polymer, the polymer characterization and structure will be given in the examples and after a description of the process of the invention.

In the process of the invention, whether one is forming the silylene- polymers (Type A) or the disilylene- polymers (Type B) the first step of the reaction is the same. In this first step of the reaction, trichloroethylene is reacted with n-butyllithium to yield dilithioacetylene. This may be represented by the following equation:

$$Cl_2C=CHCl \xrightarrow{n-BuLi} LiC\equiv CLi \qquad (1)$$

In this first step reaction, the amount of BuLi employed should be a stoichiometric amount, preferably the molar ratio of n-butyllithium to trichloroethylene should be about 3:1. The important feature is that there needs to be a sufficient amount to replace all of the chlorine in the trichloroethylene, thus the 3:1 ratio. Excess amounts can be employed, but the amount should be at least approximately a stoichiometric amount. If less than a stoichiometric amount is employed, there will be an insufficient amount to remove the chlorine atoms from the trichloroethylene and early chain termination will result in lower molecular weights. On the other hand, if there are excess amounts, that is substantially in excess of the stoichiometry, it not only is expensive but too large amounts may be harmful as the excess n-butyllithium may react with the chlorosilane reagent.

The first step reaction is fast, and therefore not time dependent. It is also not temperature dependent.

The second step reaction of the process is carried on in the same pot and is referred to as a quenching reaction. It is represented by Equation 2 below.

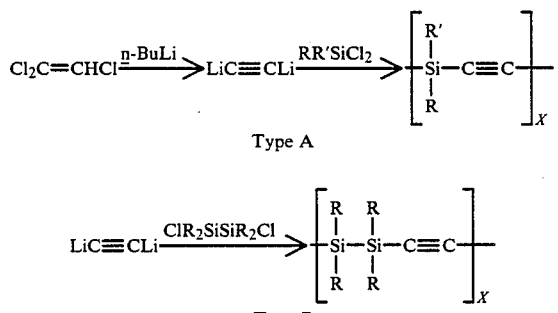

Type A

Type B

As can be seen, the reaction is virtually identical, whether one is forming a Type A polymer or a Type B polymer simply dependent upon whether it is quenched with RR'SiCl$_2$ or Cl$_2$R$_2$SiSiR$_2$Cl.

This quenching reaction, as well as the reaction with n-butyllithium is preferably conducted in the presence of an organic solvent. Suitable organic solvents can be aliphatic and aromatic hydrocarbons. Preferred solvents are tetrahydrofuran, diethyl ether, benzene and hexane.

The initial reaction, that is the combination of the trichloroethylene and the n-butyllithium can be conducted at room temperature or lower temperatures. However, since the reaction is exothermic it has been found convenient, although not essential, that the reaction be initiated at dry ice temperatures, $-78°$ C. with gradual addition of the trichloroethylene to the n-butyllithium over a period of time, for example 5–20 minutes, with stirring. Then the dry ice bath can be removed and the mixture allowed to warm to room temperature. This same repetition of cooling followed by warming can be accomplished in the addition of the silylene or disilylene compound to form the Type A or Type B polymers. Generally speaking, the reaction may be run at any temperature between $-78°$ C. and room temperature. The reaction also does not appear to be time dependent since it goes fairly rapidly. Generally, the qualities of the polymers produced appears to be better when temperatures below room temperature are employed, followed by gradual warm up.

The R moiety of the polymers can be selected from hydrogen C$_1$ to C$_{20}$ alkyl C$_6$ to C$_{20}$ aryl and C$_7$ to C$_{20}$ alkylaryl. R can also be mixed, that is, in looking at the formula for the silylenes, each of the R's may be the same or different. Where R is phenyl it has been found that the polymers are desirable because they can be pulled into fiber forms.

All of these polymers are converted to the ceramic, silicon carbide, upon heating, and the ceramic yields are uniformly high. As earlier stated, some of the polymers (R=phenyl) can be pulled into fibers. All can be cast into films.

In addition to their commercial potential as preceramic polymers, these materials have the potential of being doped electrical conductors and of possessing interesting nonlinear optical properties.

The following examples are offered to further illustrate, but not limit, the process of this invention and are offered to show characterization of the polymers.

EXAMPLES

All polymer yields are greater than 90%. Polymer characterization was by: (1) infrared (IR) which in all cases showed a C≡C stretching absorption; (2) carbon-13 nuclear magnetic resonance ($^{13}$C-NMR) which in all cases showed an acetylenic carbon at ca. $\delta 110$; (3) proton nuclear magnetic resonance ($^1$H-NMR) which showed only the appropriate absorptions for the alkyl or aryl substituents; (4) combustion elemental analysis which was within accepted error limits for calculated carbon and hydrogen content; (5) ESCA (Electron Spectroscopy for Chemical Analysis) which found only carbon and silicon in the polymers; and (6) gel permeation chromatography (GPC) from which the molecular weights (Mw) were obtained relative to polystyrene standards.

Example 1

The synthesis of $\pm$Me$_2$Si—C≡C$\pm_n$ is given as representative. All other examples follow this same basic procedure, simply using a different silyl- or disilanyl-compound.

To a dry, 500 mL, three-necked, round-bottomed flask (equipped with a water condenser, an overhead mechanical stirrer and an addition funnel and flushed with argon) was added 100 mL of a 1:1 mixture of freshly distilled ethyl ether (Et$_2$O) and tetrahydrofuran (THF) and 0.6 moles of n-butyllithium (BuLi). After cooling the solution to $-78°$ C., 0.2 moles of trichloroethylene in 50 mL of Et$_2$O was added dropwise over 20 minutes to the stirred solution. After completion of addition, the $-78°$ C. bath was removed and the mixture was allowed to warm to room temperature. After two hours of stirring at room temperature, the mixture was full of white solid (LiCl). This mixture was re-cooled to $-78°$ C. and 0.2 mole of dichlorodimethylsilane (Me$_2$SiCl$_2$) was added dropwise over 10 minutes, after which the resulting mixture was stirred at room temperature for five hours. This mixture was washed with aqueous HCl, evaporated to dryness, redissolved in 200 mL THF and added to 600 mL methanol (MeOH) to precipitate the polymer which was filtered and then dried in vacuum at 100° C. (yield-91%). The polymer thus obtained was a white powder soluble in halogenated hydrocarbons (e.g. chloroform) and aromatics (e.g., benzene) but insoluble in alcohols and aliphatic hydrocarbons (e.g., hexane).

Characterization of [Me$_2$SiC≡Cl]$_n$:
IR:
2968 cm$^{-1}$ (m); (CH$_3$ stretch)
2041 cm$^{-1}$ (w); (C≡C stretch)
1254 cm$^{-1}$ (s); (Si—CH$_3$)
816 cm$^{-1}$ (vs); (Si—CH$_3$)
Melting Point: ca. 180° C.
$^1$H-NMR (300 MHz): $\delta 0.354$ (CH$_3$)
$^{13}$C-NMR: $\delta 1.5$ (SiCH$_3$); $\delta 111.3$ (C≡C)

| Elemental Analysis: | calcd. | found |
|---|---|---|
| % C | 58.56 | 58.13 |
| % H | 7.36 | 7.39 |

ESCA (Electron Spectroscopy for Chemical Analysis): only bands for C (1s) and Si (2s and 2p) observed.

GPC: Mw from ca. 2,000–120,000 with the maximum of the nonGaussian distribution at ca. 20,000. I (Mw/Mn) ~2.

Thermogravimetric Analysis (TGA): Weight lost, monitored to 900° C., was 36%. Monitoring the evolved gas revealed it initially to be composed of oligomers and later to be exclusively methane ($CH_4$). Thermal decomposition is essentially at ca. 800° C.

High-Temperature X-Ray: Heating the polymer up to 1300° C. while monitoring by X-ray diffraction revealed only the 111, 220 and 311 lines of β-silicon carbide.

Examples 2–5

The following Type A polymers were prepared using the exact procedure earlier described. R equals phenyl, methyl, mixed R's, wherein one is phenyl and one is methyl, and where both R's are the same and equal hydrogen. With the exception of the latter case, each of these was characterized in the manner given above, each was formed in high yield, and had molecular weights within the range herein specified.

Examples 6–7

The following Type B polymers were prepared. In these instances R equals methyl in the first case, and in the second case R equals phenyl. Both reactions performed satisfactorily and both yielded good polymer yields.

In all of the polymers prepared in examples 1–7, all synthesized polymers of both Type A and Type B melt and remelt without decomposition, thus films can be either melt cast or solvent cast. Only those polymers which had at least one phenyl substituent on silicon pulled fibers of good quality, and these polymers also produced the best quality films.

It was also found that doping of the polymers with iodine in vacuo raised their electrical conductivities several orders of magnitude. However, only those polymers of Type B showed an increase approaching the semiconductor region.

What is claimed is:

1. A method of preparing organosilicon polymers having recurring silyleneacetylene units of the formula:

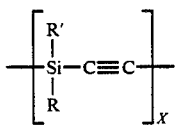

wherein R and R' are organic moieties selected from the group consisting of hydrogen, $C_1$ to $C_{20}$ alkyl, $C_6$ to $C_{20}$ aryl, and $C_7$ to $C_{20}$ alkylaryl and x is an integer from 20 to 500, comprising:
reacting trichloroethylene with normal butyllithium to prepare dilithioacetylene; and
reacting said dilithioacetylene with a dichlorosilane of the formula: $RR'SiCl_2$, wherein R and R' are as previously defined.

2. The process of claim 1 wherein the amount of each reactant is at least a stoichiometric amount.

3. The process of claim 2 wherein the reaction is conducted in a suitable reaction promoting organic solvent.

4. The process of claim 2 wherein the reaction solvent is selected from the group of aliphatic and aromatic hydrocarbons.

5. The process of claim 3 wherein said solvent is selected from the group consisting of tetrahydrofuran, diethylether, benzene and hexane.

6. A method of preparing organosilicon polymers having recurring disilyleneacetylene units of the formula:

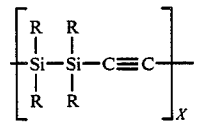

wherein R is an organic moiety selected from the group consisting of hydrogen, $C_1$ to $C_{20}$ alkyl, $C_6$ to $C_{20}$ aryl, and $C_7$ to $C_{20}$ alkylaryl and X is an integer from 20 to 500, comprising:
reacting trichloroethylene with normal butyllithium to prepare dilithioacetylene; and
reacting said dilithioacetylene with a dichlorosilane of the formula: $ClR_2SiSiR_2Cl$, wherein R is as previously defined.

7. The process of claim 6 wherein the amount of each reactant is at least a stoichiometric amount.

8. The process of claim 7 wherein the reaction is conducted in a suitable reaction promoting organic solvent.

9. The process of claim 8 wherein the reaction solvent is selected from the group of aliphatic and aromatic hydrocarbons.

10. The process of claim 8 wherein said solvent is selected from the group consisting of tetrahydrofuran, diethylether, benzene and hexane.

* * * * *